United States Patent [19]

Colarow et al.

[11] Patent Number: 5,314,706
[45] Date of Patent: May 24, 1994

[54] HEAT-STABLE OIL AND WATER EMULSION AND PREPARATION THEREOF

[75] Inventors: Ladislas Colarow, Savigny; Gérard Masson, Cully, both of Switzerland; Hans U. Trueck, Stuttgart, Fed. Rep. of Germany

[73] Assignee: Nestec S.A., Vevey, Switzerland

[21] Appl. No.: 985,132

[22] Filed: Dec. 2, 1992

[30] Foreign Application Priority Data

Dec. 12, 1991 [EP] European Pat. Off. ........ 91121318.9

[51] Int. Cl.$^5$ .......................... A23D 7/00; A23J 7/00
[52] U.S. Cl. ...................................... 426/605; 426/44; 426/46; 426/52; 426/589; 426/613; 426/662
[58] Field of Search ................... 426/605, 613, 33, 44, 426/46, 589, 662, 52

[56] References Cited

U.S. PATENT DOCUMENTS 4,034,124 7/1977 van Dam ............................. 426/605
4,794,015 12/1988 Fujita et al. .

FOREIGN PATENT DOCUMENTS 0253429 1/1988 European Pat. Off. .
0260573 3/1988 European Pat. Off. .
0319064 6/1989 European Pat. Off. .
0328789 8/1989 European Pat. Off. .
0401939 12/1990 European Pat. Off. .
2915613 10/1980 Fed. Rep. of Germany .
1525929 9/1978 United Kingdom .

OTHER PUBLICATIONS

European Search Report No. 91 12 1318, Jul. 28, 1992.

*Primary Examiner*—Helen Pratt
*Attorney, Agent, or Firm*—Vogt & O'Donnell

[57] ABSTRACT

An egg yolk fortified with exogenous soybean lysophosphatidylcholine contained in exogenous soybean lysophospholipids is employed as an emulsification agent in oil and water emulsions, particularly in emulsions which are sterilized. The agent may be obtained by hydrolyzing phospholipids derived from soybeans with phospholipase A2, deactivating the phospholipase A2 with a proteolytic enzyme and then inactivating the proteolytic enzyme by heat-treatment at a temperature of from 80° C. to 90° C., and then, egg yolk is fortified by combining and homogenizing the so-obtained lysophospholipids, or exogenous phospholipids containing lysophosphatidylcholine otherwise obtained, with egg yolk.

17 Claims, No Drawings

HEAT-STABLE OIL AND WATER EMULSION AND PREPARATION THEREOF

BACKGROUND OF THE INVENTION

The invention concerns a heat-stable oil-in-water emulsion and a process for its preparation. Great Britain Complete Patent Specification No. 1 525 929 concerns a water-in-oil emulsion with a phospholipoprotein containing material (for example egg yolk) modified by phospholipase A (PLA). This emulsion is stable, i.e., when exposed for 30 min. to 100° C. Although this emulsion is effectively heat-stable, the great disadvantage is that the egg yolk is enzymatically modified, and secondly, the suppression of any residual activity of PLA by proteases is not possible since the proteolytic enzymes would modify the egg yolk proteins and PLA alone can only be inactivated at a very high temperature (160° C.).

SUMMARY OF THE INVENTION

It has now been found that it is possible to prepare a heat-stable oil-in-water emulsion by using unmodified egg yolk as emulsifying agent, said emulsion having no residual PLA activity.

The invention provides a heat-stable oil-in-water emulsion containing between 3 and 85% of oil, between 1 and 10% of egg yolk stabilized with salt or sucrose and containing acetic acid and water, wherein the emulsion further contains between 0.1 and 5 g of exogenous soybean lysophosphatidylcholine (LPC) based on 1000 g of said emulsion.

The invention further provides a process for the preparation of egg yolk fortified with exogenous soybean lysophosphatidylcholine and a process for the use thereof to make the above-mentioned emulsion. In one process, phospholipids of soybean origin are hydrolyzed with phospholipase A2, the phospholipase is inactivated with a proteolytic enzyme and then, the proteolytic enzyme is inactivated by a heat-treatment at a temperature of from 80° C. to 90° C. The so-obtained lysophospholipids, or exogenous lysophospholipids containing lysophosphatidylcholine obtained by other processes discussed further below, are combined with egg yolk, which may be stabilized with salt or sucrose, and the mixture is homogenized thereby providing egg yolk fortified with the lysophosphatidylcholine, the mixture being homogenized by such as sonication or by high-pressured homogenization. The fortified egg yolk product is mixed with an oil, acetic acid and water to form an emulsion, and the emulsion then is sterilized. The emulsion may further include additional salt and further ingredients for preparation of sauces, mayonnaises, or salad dressings.

DETAILED DESCRIPTION OF THE INVENTION

The LPC is prepared from soybean lecithin having a high content of phosphatidylcholine, (PC), for example between 570 and 700 μmol PC per gram of the total soybean lecithin fraction (molecular weight of PC as oleyl=786.15 gives between 44 and 55% of PC). In this case, the modification is made with a suitable source of phospholipase A2 (PLA2) isolated from pancreatin or prepared by the use of microbial PLA isolated from *Aspergillus niger* or *Rhizopus arrhizus* (European Patent Publication No. 0260573). For stopping the hydrolysis reaction a proteolytic enzyme is added, this enzyme being finally inactivated by heat treatment.

The exogenous lysophospholipids (LPL) are also obtainable from commercial lyso-lecithins, for example with an amount of LPC corresponding to 350 to 450 μmol per gram of such lyso-lecithin. (Molecular weight of LPC as oleyl=521,66 gives between 18.3 and 23.5% LPC).

The type of emulsion considered according to the invention is an edible product like sauces, dressings, mayonnaise, enteral feeding products. By oil, we mean all food grade oils such as soy bean oil, sunflower oil, grapeseed oil, peanut oil, corn oil, butter oil and also butter fat.

The emulsion contains preferably between 30 and 80% oil.

The egg yolk source is a commercially available egg yolk separated from egg white from hen eggs, quails or ostriches stabilised with NaCl (8-10%) or sucrose (20%). The egg yolk content of the emulsion is preferably between 1.5 and 7.5%.

All the percentages given are by weight.

The emulsion contains preferably between 0.5 and 1 g exogeoous LPC in the sauce case and between 2 and 3 g exogenous LPC in the case of mayonnaise, based on 1000 g emulsion. A too small amount of LPC cannot give the required heat, stability.

In a process of the invention, phospholipids of soybean origin are hydrolysed with PLA2 (at a degree of conversion between 20 and 80%; we define the degree of conversion by the molar ratio of LPC to PC, see table 1). The PLA2 is deactivated with a proteolytic enzyme, this latter enzyme being deactivated by a heat treatment at 80°-90° C. The resulting lysophospholipids are mixed with the egg yolk and the salt, the mixture is sonicated or homogenized at high pressure, the fortified egg yolk is mixed with the oil, the acetic acid and water, and the resulting emulsion is sterilized. The proteolytic enzyme is neutrase or alcalase. Ultrasonic agitation or high-pressure homogenization is required to incorporate the exogenous LPL into the natural formations of PL and proteins which are present in egg yolk. The egg yolk enriched, or fortified, with between 1.5 and 3% by weight exogenous LPC produces emulsion systems which are stable for 30 min at 100° C.

Exogenous LPL can be obtained from an alcohol-soluble soybean lecithin fraction containing 570–700 μmol phosphatidylcholine (PC) per gram. One volume of the PC fraction is homogenized with 9–12 volumes of water at about 50° C. The pH value is adjusted to 9 with a 0.1 N NaOH solution. The homogenate is then completed with a 5% solution of calcium chloride (10–100 ml per liter) and pancreatic phospholipase A2 (one ml or 10,000 IU per liter homogenate). The homogenate is kept for 24–96 hours at room temperature with gentle agitation. To interrupt the hydrolysis, 3–5 ml (1.5–2.5 Anson Units) of neutrase (Novo) per ml PLA2 are added to the homogenate and the mixture is kept for 2 hours at 50° C. The proteolytic enzyme is then deactivated by increasing the temperature to 85°-95° C. for 2-10 min.

Typical LPL homogenates are characterized by elevated molar ratios of LPC:PC as indicated in Table 1:

TABLE 1

| Homogenate No. | 1 | 2 |
|---|---|---|
| mmols LPC per kg (1): | 35.8 | 50.3 |

TABLE 1-continued

| Homogenate No. | 1 | 2 |
|---|---|---|
| grams LPC per kg (2): | 18.7 | 26.2 |
| mmols PC per kg (1): | 13.6 | 13.2 |
| grams PC per kg (3): | 10.7 | 10.4 |
| LPC:PC molar ratio: | 72:28 | 79:21 |
| LPC:PC weight ratio: | 64:36 | 72:28 |

(1) Quantitative values obtained by following the published method by L. Colarow "Quantitative Transmittance Densitometry of Phospholipids After Their Specific Detection with a Molybdate Reagent on Silica Gel Plates" (1990) J. Planar Chromatography, 3, 228–231
(2) converted via MW 521.66 for oleoyl-LPC.
(3) converted via MW 786.15 for dioleoyl-PC Exogenous LPL are also obtainable from commercial lyso-lecithins. The latter are prepared preferably from the alcohol-soluble fraction of soybean lecithin by the use of bacterial PLA such as isolated from *Aspergillus niger* and *Rhizopus arrhizus* (EP 0 260 573). The lyso-lecithins are dispersible in water and thus also in egg yolk. A typical level of LPC in such lyso-lecithins corresponds to 350–450 μmols per gram.

The commercial lyso-lecithins can be also fractionated with acetone which insolubilizes all the PL and the LPL. The acetone-insoluble fraction is almost exempt of neutral lipids (triglycerides, sterols, unesterified fatty acids and so on) and as such, it may contain 600–700 μmols LPC per gram. Another method for deoiling vegetable lecithins is described in German Patent No. 29 15 613.

Natural egg yolk can be fortified with the soybean LPL homogenate in two different ways, depending on the amount of water contained in the target product, which usually is high for most sauces or salad dressings and low for standard mayonnaises.

In the case of sauces or salad dressings, egg yolk (1000 g) enriched with NaCl (8–10%) or sucrose (20%), is diluted with 400–600 g of the LPL homogenate and passed through a two-stage homogenizer operating at 400 and 60 bars. The resulting fortified egg yolk emulsion is used as such for the preparation of various heat-stable sauce formulas characterized by water contents higher than 10%.

The same egg yolk used for the preparation of standard mayonnaises is preferably fortified only with a dehydrated LPL homogenate which can be prepared by lyophilization or spray-drying. Before dehydration, the homogenate (1000–1500 g) is enriched with 10-25 g maltodextrin as carrier agent. The resulting LPL powder is usually added to salted egg yolk at the following amounts:

| |
|---|
| 850–890 g egg yolk |
| 75–85 g NaCl |
| 30–60 g powdered soybean LPL |

The three ingredients are vigorously stirred using a blade propeller and the temperature is brought to 50°–60° C. The resulting suspension is sonicated at 50°–55° C. using a titanium horn supplying 500–1000 watts until complete homogeneity is reached. The emulsion obtained is exempt of any solid particles, and it can be used for the preparation of heat-stable mayonnaises.

Egg yolk can be also fortified with standard or, preferably deoiled lyso-lecithins. Deoiled or powdered lyso-lecithins are incorporated in the egg yolk as already described.

TEST PROCEDURES AND EXAMPLES

Egg yolk fortified with the liquid LPL was tested for its ability to form heat-stable emulsions using a simple model.

All ingredients, i.e., fortified egg yolk, oil, acetic acid (vinegar), NaCl, water, are homogenized using a Wolff batch mixer operating for 2 min at 25°–50° C. under reduced pressure. The resulting emulsions were subjected to UHT-treatment for 5–20 sec at 140° C., cooled down to 80° C. and tested for their heat-stability using a simple "Cooking Stability Test" (CST) at 80, 90 and 105° C.

The test reproduces the true conditions at which a typical sauce is thought to be heated by the consumer. About 150 g of the test emulsion are weighed in a 500-ml glass beaker and placed on a kitchen hot-plate fitted with a bench blade stirrer operating at 120 rpm. The temperature of the test emulsion is measured using a microprocessor-based thermocouple probe communicating with a strip-chart recorder. The stability of the emulsion is observed visually at 80, 90 and 105° C. Broken emulsions show a sharp separation of the oil and aqueous phases. In some cases, the emulsion remains stable and shows only fine oil droplets floating on the surface.

Egg yolk fortified with the powdered LPL was tested using a standard mayonnaise model. Mayonnaises containing more than 80% oil and 9.0–9.2% fortified yolk, were kept in hermetically capped sterilization flasks for 30 and 60 min at 100°–101° C. and observed for oil separation.

The presence of soybean LPC in heat-stable sauces and mayonnaises is demonstrated as follows. First the total lipids are extracted according to the Folch method (see above mentioned article of L. Colarow) and then separated by preparative high performance thin-layer chromatography (HPTLC) into their phospholipid classes according to the above mentioned method of L. Colarow in J. Planar Chromatography. After detection with a non-destructive primulin reagent, the phospholipid classes are visible under UV light at 366 nm. The LPC band is scraped off and then transesterified using acetyl chloride as the catalyst. The resulting fatty acid methyl esters are extracted in a hexane phase and then analysed by capillary chromatography for their composition. The fatty acid compositions of soybean and egg yolk LPC are compared in TABLE 2.

TABLE 2

| % Fatty Acid | | Egg Yolk LPC | Soybean LPC |
|---|---|---|---|
| Palmitic | 16:0 | 65.3 | 18.9–27.1 |
| Stearic | 18:0 | 25.2 | 5.7–8.1 |
| Oleic | 18:1 | 6.8 | 5.6–9.1 |
| Linoleic | 18:2 | 0.9 | 49.2–58.0 |
| Linolenic | 18:3 | 0.1 | 3.7–6.5 |

In summary, egg yolk fortified with soybean LPL has several advantages in comparison to egg yolk modified with pancreatic phospholipase A2:

a) Products prepared from the former ingredient contain natural egg yolk.

b) Phospholipids in the final products will not be modified by PLA2 since it is inactivated with a proteolytic enzyme, which in turn is inactivated by heat treatment.

c) All products can be characterized by the presence of soybean LPC which presents a typical fatty acid composition.

Considering the emulsion obtained, the LPL and LPC content is also determined by the above mentioned procedure (see article of L. Colarow). For determining the egg yolk content of the emulsion, one calculates the cholesterol content. The total fats are extracted according to Folch and the quantity of fats is determined. Afterward a colorimetric method on the fats permits the calculation of the percentage of cholesterol permitting thus the calculation of the egg yolk content. (100 g egg yolk contain 1353 mg of cholesterol).

EXAMPLE 1

Aqueous Homogenate of Soybean Lysophospholipids

A soybean lecithin fraction (200 g) containing more than 42 weight % PC and roughly the same amount of triglycerides is weighed into a 2.5 l glass beaker and mixed with 1600 ml deionized and sterilized water. The mixture is brought to 50°-55° C. in a microwave oven and then homogenized using a Polytron operating at 5000-10000 rpm. The resulting emulsion (pH 4.2-4.5) is completed with 20-25 ml 1 N aqueous NaOH and the pH value adjusted to 9.0.

The enzymatic hydrolysis is started after the addition of calcium chloride (5 g) dissolved in 200 ml water and 2.0 ml or 20,000 I.U. pancreatic phospholipase A2. The homogenate is kept under agitation and in a dark room for 72 hours at 25° C. after which 5.0 ml or 2.5 Anson Units of neutrase are added. Proteolytic activity of the enzyme is sustained for 2 hours at 50° C. after which the homogenate is brought from 50° to 90° C. in a microwave oven for 5 min and then allowed to cool to 4° C. The homogenate (No. 2) is characterized by the molar levels of PC and LPC as shown in TABLE 1.

EXAMPLE 2

Powdered Soybean Lysophospholipids

The aqueous LPL homogenate as described in Example 1 and Maltodextrin (25 g) are brought to 50° C. in a microwave oven. The mixture is rapidly homogenized using a rotorstator generator and then allowed to freeze to −40° C. After freeze-drying, the final product appears like an off-white powder. The powder is easily dispersible in water at 35°-60° C., and the amount of LPC corresponds to 837 μmols per gram (43% LPC per gram).

EXAMPLE 3

Powdered Soybean Lyso-lecithin

One volume (4000 g) of commercial soybean lysolecithin containing 400 μmols LPC per gram (or 20.9 weight % equivalent of oleoyl-LPC) is suspended in four volumes of hexane at 40° C. A glass column is loaded with 10 kg silica gel Merck 7734 (70-230 mesh) which was previously activated for 20 hrs at 165° C. and then suspended in 50 l hexane. After elimination of the excess hexane phase, the column is carefully loaded with the suspension of lyso-lecithin in hexane. The suspension is allowed to pass through the column, followed by 2 volumes of hexane. All complex lipids are collected as micelles in the hexane phase. The latter is concentrated under vacuum to complete dryness, homogenized with ten volumes of deionized and sterilized water and then freeze-dried as in Example 2. The resulting product (2400 g) is an off-white powder which disperses rapidly in water at 35°-60° C. The amount of LPC corresponds to 660 μmols per gram or 34.5 weight % equivalent to oleoyl-LPC.

EXAMPLE 4

Homogenized Fortified Egg Yolk For Sauce Formulae

Natural egg yolk (640 g) containing 20 weight % sucrose and the aqueous LPL homogenate (317 g) described in Example 1, are brought separately to 50° C. and then stirred together for 5 min. The mixture is passed through a two-stage homogenizer operating at 400 and 60 bars at 50° C. and then poured into a Wolff batch mixer containing 2500 g soybean oil, 45 g vinegar (11% acetic acid), 120 g NaCl and 6378 g water, as described in TABLE 3. The mixer is first operated under 0.5-0.6 bars for 2 min at 20° C. and 1500 rpm and then for 1 min at 50° C. and 3000 rpm. Then, the mixture is passed again through a two-stage homogenizer operating at 100 and 20 bars. Finally, the homogenate is exposed to UHT treatment for 15-20 sec at 140° C., cooled to 80° C. and sampled for the subsequent stability test as described previously. The results on heat stability are shown in TABLE 4. The LPC content corresponds to 0.82 g for 1000 g of sauce.

EXAMPLE 5

Fortified Yolk For Sauce Formulae I

Egg yolk (640 g) containing 20 weight % sucrose and the aqueous LPC homogenate (317 g) are mixed together as in Example 4. The resulting emulsion and all other ingredients specified in TABLE 3 are processed in the Wolff batch mixer as in Example 4 without, however the previous two-stage homogenization at 400 and 60 bars. The final emulsion is passed through the two-stage homogenizer operating at 100 and 20 bars only, followed by the UHT treatment as in Example 4. The results of heat stability evaluation are shown in TABLE 4. The LPC content corresponds to 0.82 g for 1000 g of sauce.

EXAMPLE 6

Fortified Yolk For Sauce Formulae II

Preparation of the present emulsion is essentially the same as in Example 5. The only difference consists in the increased percentage of vinegar and the pH value reduced from 4.82 to 4.24. The results of heat stability tests evaluation are shown in TABLE 4.

EXAMPLE 7

Standard Sauce Test Formula

Egg yolk (640 g) containing 20 weight % sucrose and all other ingredients specified in TABLE 3 were processed as described in Examples 5-6. The standard formula was prepared without using the aqueous LPL homogenate described in Example 1. Results of heat stability evaluation are shown in TABLE 4.

EXAMPLE 8

Standard Mayonnaise

Standard mayonnaise is prepared on a laboratory scale using the following ingredients:

83.00 g soybean oil
9.20 g commercial egg yolk
0.80 g NaCl

-continued 2.00 g mustard
4.00 g vinegar
0.34 g sugar

Egg yolk, salt, sugar and mustard are mixed together in a convenient kettle using a kitchen whipper operating at 100-600 rpm. The oil is added slowly during whipping so that one half of the stock is consumed in about 10 min. The stock volume of vinegar is added slowly when the mayonnaise starts to harden in excess. The remaining stock of oil is added in the same way. Results on heat stability evaluation are shown in TABLE 5.

EXAMPLE 9

Fortified Egg Yolk For Heat-Stable Mayonnaises

Egg yolk (87 g) and NaCl (8 g) are stirred until complete dissolution of the salt. Powdered soybean LPL (5 g, 2.15 g LPC)) as described in Example 2 are added to the salted egg yolk, and the mixture is exposed to a vigorous stirring for 5 min at 50° C. The resulting mixture is fluidized by sonication at 50° C. using a titanium horn which supplies 1000 watts. The sonication is interrupted after dissolution of all solids in the egg yolk. The resulting fortified yolk is used for the preparation of mayonnaise in the same way as described in Example 8.

EXAMPLE 10

Egg Yolk Fortified With Non-Modified Phospholipids

Salted egg yolk (90 g) as described in Example 9 and a soybean lecithin fraction containing more than 42% phosphatidylcholine were processed as described in Example 9. The results on heat stability are shown in TABLE 5.

EXAMPLE 11

Egg Yolk Fortified With a Powdered Lyso-Lecithine

Salted egg yolk (90 g) as described in Example 9 and a powdered soybean lyso-lecithin fraction (Example 2) were processed as described in Example 9. TABLE 5 shows the results on heat stability (content of LPC=2.3 g for 1000 g of mayonnaise.

TABLE 3

| Gram/Process | Ex. 4 | Ex. 5 | Ex. 6 | Ex. 7 |
| --- | --- | --- | --- | --- |
| Egg yolk | 640 | 640 | 640 | 640 |
| Soybean LPL (Ex. 1) | 317 | 317 | 317 | 0 |
| Homogenization 400/60 bars | yes | no | no | no |
| Soybean Oil | 2500 | 2500 | 2500 | 2500 |
| Vinegar | 45 | 45 | 120 | 45 |
| NaCl | 120 | 120 | 120 | 120 |
| Water | 6378 | 6378 | 6303 | 6695 |
| Total | 10000 | 10000 | 10000 | 10000 |
| Homogenization 100/20 bars | yes | yes | yes | yes |
| UHT Process | 140° C. | 140° C. | 140° C. | 140° C. |
| Final pH Value | 4.98 | 4.82 | 4.24 | 4.74 |

TABLE 4

| °C. | Ex. 4 | Ex. 5 | Ex. 6 | Ex. 7 |
| --- | --- | --- | --- | --- |
| 80 | stable | droplets[1] | droplets | stable |
| 90 | stable | droplets | droplets | broken |
| 105 | stable | droplets | droplets | — |

[1] a stable system with free oil droplets at the surface

TABLE 5

| Min at 100° C. | Example 8 | Example 10 | Example 11 |
| --- | --- | --- | --- |
| 0 | stable | stable | stable |
| 5 | broken | stable | stable |
| 10 | — | broken | stable |
| 30 | — | — | stable |

We claim:

1. A process for the preparation of an oil and water emulsion comprising hydrolyzing phospholipids of soybean origin with phospholipase A2 to obtain an homogenate containing lysophospholipids and lysophosphatidylcholine, adding a proteolytic enzyme suitable for inactivating the phospholipase A2 and the homogenate to inactive the phospholipase A2 and then heating the homogenate to a temperature of from 80° C. to 90° C. to inactivate the proteolytic enzyme, combining the enzyme-inactivated homogenate with egg yolk stabilized with a substance selected from the group consisting of salt and sucrose to obtain a mixture, homogenizing the mixture to obtain egg yolk fortified with lysophosphatidylcholine, mixing the fortified egg yolk with oil, water and acetic acid to form an emulsion and sterilizing the emulsion.

2. A process according to claim 1 wherein the mixture is sonicated to homogenize the mixture.

3. A process according to claim 1 wherein the mixture is homogenized in two stages under pressure to homogenize the mixture.

4. A process according to claim 1 further comprising dehydrating the enzyme-inactivated homogenate prior to mixing the lysophospholipids with the stabilized egg yolk.

5. A process according to claim 4 wherein the enzyme-inactivated homogenate is lyophilized.

6. A process according to claim 4 further comprising adding a carrier agent to the enzyme-inactivated homogenate and wherein the homogenate and carrier are spray dried.

7. A process according to claim 1 wherein the soybean phospholipids are derived from soybean lecithin.

8. A process according to claim 7 wherein the soybean lecithin has a phosphatidylcholine content of between 44% and 55% by weight.

9. A process according to claim 1 wherein the enzyme-inactivated homogenate contains lysophosphatidylcholine in an amount sufficient to provide from 0.1 g to 5 g lysophosphatidylcholine per 1000 g emulsion.

10. The product of the process of claim 1.

11. An oil and water emulsion comprising, by weight, between 3% and 85% oil, water and acetic acid and between 1% and 10% of an emulsification agent comprising a homogenate of egg yolk of exogenous soybean lysophopholipid (LPL) containing lysophosphatidylcholine (LPC) and of an egg yolk stabilizer substance selected from the group consisting of salt and sucrose, wherein the emulsion contains between 0.1 g and 5 g LPC per 1000 g emulsion.

12. An emulsion according to claim 11 wherein the emulsion contains phospholipase A2 having no activity.

13. An emulsion according to claim 11 wherein the emulsion comprises between 30% and 80% oil.

14. An emulsion according to claim 11 wherein the acetic acid is provided by vinegar.

15. An emulsion according to claim 11 wherein the LPL has a degree of conversion of between 20% and 80%.

16. An emulsion according to claim 11 wherein the LPL contains LPC in an amount of from 350 to 450 μmols per gram.

17. An emulsion according to claim 11 wherein the LPL contains LPC in an amount of from 600 to 700 μmols per gram.

* * * * *

UNITED STATES PATENT AND TRADEMARK OFFICE
CERTIFICATE OF CORRECTION

PATENT NO. : 5,314,706
DATED : May 24, 1994
INVENTOR(S) : Ladislas Colarow, et al It is certified that error appears in the above-indentified patent and that said Letters Patent is hereby corrected as shown below:

Column 8, line 13, "and" should be --to--.
Column 8, line 14, "inactive" should be --inactivate--.
Column 8, line 49, after "yolk" insert a comma.

Signed and Sealed this

Thirteenth Day of September, 1994

Attest:

BRUCE LEHMAN

*Attesting Officer*     *Commissioner of Patents and Trademarks*